(12) United States Patent
Sturm et al.

(10) Patent No.: US 6,981,799 B2
(45) Date of Patent: Jan. 3, 2006

(54) SLIDE BEARING FOR A CENTRIFUGAL PUMP

(75) Inventors: Hans-Dieter Sturm, Gerolsheim (DE); Frank Sehr, Birkenheide (DE); Anja Dwars, Nuremberg (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 10/444,064

(22) Filed: May 23, 2003

(65) Prior Publication Data

US 2004/0013332 A1  Jan. 22, 2004

Related U.S. Application Data

(63) Continuation of application No. PCT/EP01/13096, filed on Nov. 13, 2001.

(30) Foreign Application Priority Data

Nov. 24, 2000 (DE) ............................... 100 58 499

(51) Int. Cl.
*F16C 33/06* (2006.01)
(52) U.S. Cl. ....................... 384/297; 384/911; 384/913
(58) Field of Classification Search ................ 384/297, 384/215, 911, 913, 276
See application file for complete search history.

(56) References Cited

U.S. PATENT DOCUMENTS 5,051,112 A   9/1991  Keshavan et al.
5,087,529 A   2/1992  Engel et al.
5,795,075 A * 8/1998  Watson ........................ 384/215
6,467,966 B1 * 10/2002 Diederich et al. .......... 384/297

FOREIGN PATENT DOCUMENTS

DE    19524510    1/1997
EP     0345214   12/1989
FR    2 204 250    5/1974

OTHER PUBLICATIONS

"Tribaloy —eine-cershleiβ- und korrosionsbeständige-Legierung", *Antriebstechnik 14*, No. 8 (1975), p. 480.

* cited by examiner

*Primary Examiner*—Lenard A. Footland
(74) *Attorney, Agent, or Firm*—Crowell & Moring LLP

(57) ABSTRACT

A slide bearing for a centrifugal pump in which the slide bearing is lubricated by the pumped medium and is composed of a stationary part disposed in the housing of the centrifugal pump and a rotatable part which is supported by the shaft of the centrifugal pump and interacts with the stationary part to give a sliding pair. One part of the sliding pair is composed of a composite material, especially carbon fibers or silicon carbide fibers in a matrix of PEEK, carbon or carbon combined with silicon carbide. The other part of the sliding pair has a sliding surface made of a hard metal material and supported by a support material. A bond produced in the molten state is formed between the hard metal material of the sliding surface and the support material which supports the sliding surface of the other part of the slide bearing. The resulting slide bearing can be used in chloride-containing and/or corrosive media and has a sliding surface that is not prone to undercutting corrosion.

6 Claims, 1 Drawing Sheet

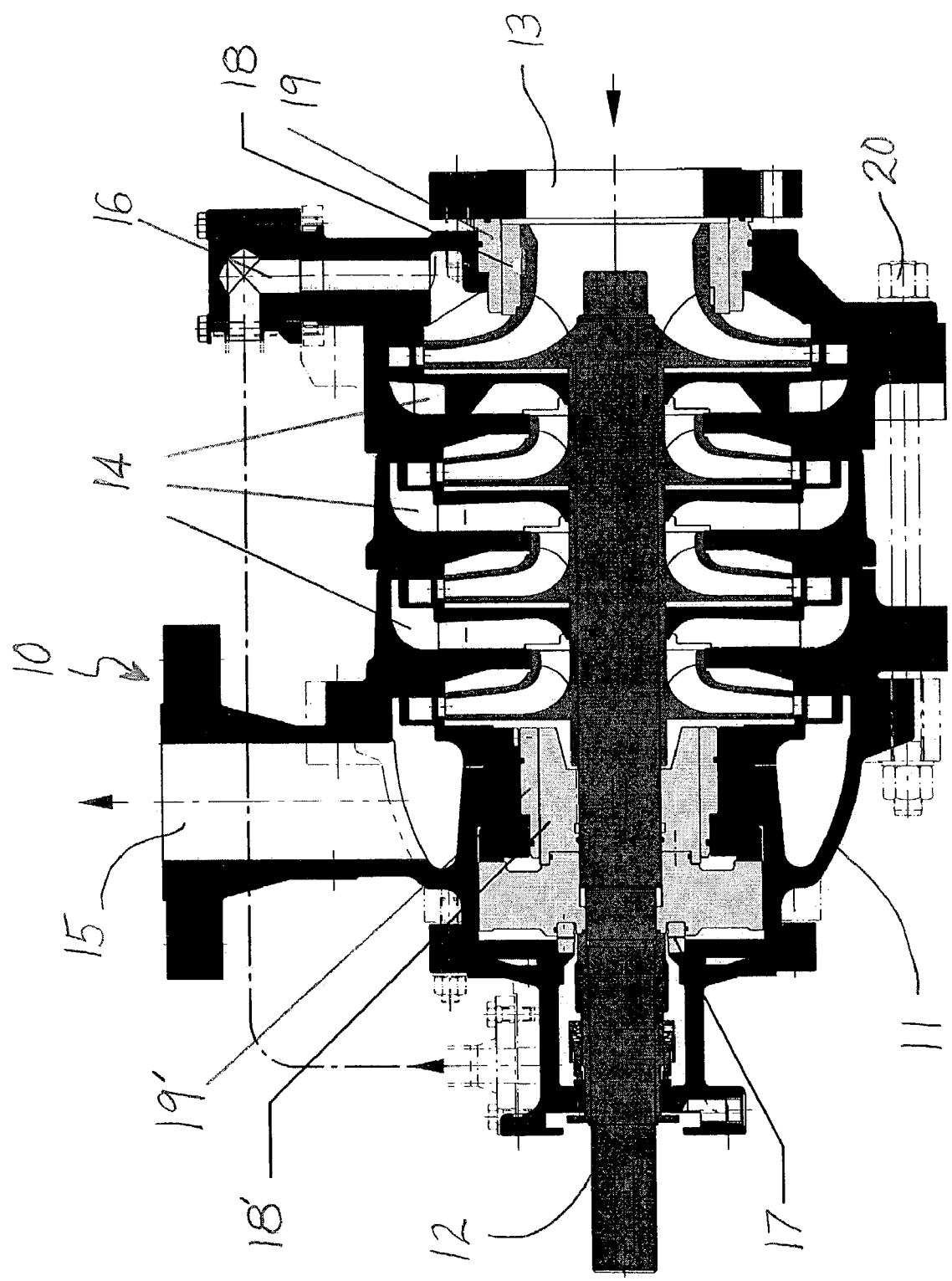

SLIDE BEARING FOR A CENTRIFUGAL PUMP

CROSS REFERENCE TO RELATED APPLICATIONS

This application is a continuation of international patent application No. PCT/EP01/13096, filed Nov. 13, 2001 designating the United States of America, and published in German as WO 02/42032 A1, the entire disclosure of which is incorporated herein by reference. Priority is claimed based on Federal Republic of Germany patent application No. DE 100 58 499.3, filed Nov. 24, 2000.

BACKGROUND OF THE INVENTION

The invention relates to a slide bearing of a centrifugal pump that is lubricated by the pumped medium and comprises a stationary part disposed in the housing of the centrifugal pump and a rotatable part disposed on the shaft of the centrifugal pump and interacting with the stationary part to form a sliding pair. One part of this sliding pair is made of a composite material, particularly of carbon fibers or silicon carbide (SiC) fibers with a matrix of polyetheretherketone (PEEK), carbon, or carbon and silicon carbide, while the other part has a sliding surface that is made of a hard metal material and is supported by a supporting material.

Tribological investigations have shown that the loading capacity of self-paired composite materials used in slide bearings is limited. However, if a sliding pair has hard, smooth-polished counter-rotating elements, the pair has excellent properties for use in bearings lubricated by the medium. Among other things, such a pair is highly wear resistant. This is due to the fact that the very hard counter-rotating elements are wear resistant even under high tribological loading in the mixed friction range, in part even with simultaneous solid loading. As a consequence, there is no abrasive wear on the hard counter-rotating partner elements. Nor can the products of abrasive wear destroy the softer counter-rotating partner element. Wear-related widening of the clearance is minimized.

One known measure to realize a slide bearing with the described properties is to apply a hard coating with a strong bond to the counter-rotating partner element of the bearing part that is made of a composite material. This type of hard coating based on chromium carbide, aluminum oxide, titanium oxide, or metal layers has proven successful when used with non-corrosive, chemically neutral, chloride-free media. However, the resistance of such slide bearings against chloride-containing and/or corrosive media is limited because of the risk of subcorrosion underneath the coatings. This type of corrosion causes the coating to chip or spall and thereby destroys the slide bearing, which in turn can have far reaching consequences for a centrifugal pump that is equipped with such a slide bearing.

SUMMARY OF THE INVENTION

It is the object of the invention to provide an improved slide bearing for a centrifugal pump lubricated by liquid pumped by the pump.

Another object of the invention is to provide a slide bearing for a centrifugal pump which can be used in chloride-containing and corrosive media.

A further object of the invention is to provide a slide bearing for a centrifugal pump having a sliding surface of which is not subject to subcorrosion.

These an other objects are achieved in accordance with the present invention by providing a slide bearing for a centrifugal pump lubricated by a medium pumped by the pump, the pump having a housing and a rotatable shaft, the slide bearing comprising a stationary part disposed in the housing of the centrifugal pump and a rotatable part which is disposed on the shaft of the centrifugal pump and interacts with the stationary part to form a sliding pair, in which one part of the sliding pair is made of a composite material, and the other part of the sliding pair has a sliding surface that is made of a hard metal material and is supported by a supporting material, and in which the hard metal material of the sliding surface and the supporting material that supports the sliding surface of said other part are joined by a bond produced in a molten state.

BRIEF DESCRIPTION OF THE DRAWING

The invention will be described in further detail hereinafter with reference to an embodiment depicted in the accompanying drawing FIGURE, which is a sectional view through a centrifugal pump with slide bearings lubricated by the pumped liquid.

DETAILED DESCRIPTION OF THE INVENTION

According to the invention, a bond is produced in the molten state between the hard metal material of the sliding surface and the supporting material that supports the sliding surface of the corresponding slide bearing part.

A bond produced in the molten state reliably prevents a corrosive medium from creeping underneath. It is resistant against spalling, chipping or breaking. This bond can be produced by deposition welding a hard corrosion- and wear-resistant material onto a ductile supporting material. A molten layer consisting of the hard material and the supporting material is produced in the weld zone and after solidification ensures intimate bonding between the materials.

A particularly advantageous embodiment of the invention is obtained by using a part that is produced by casting, in which the supporting material and the material of the sliding surface are comprised of a homogenous, highly wear- and corrosion-resistant alloy. It is readily apparent that a part produced by casting has two advantages in particular. First, it can be produced at comparatively low cost, and second, due to its homogeneity, it is highly resistant against chemical and mechanical loading.

In another advantageous embodiment of the invention it is proposed to make the casting carrying the sliding surface of a cobalt-based alloy. As an alternative thereto it is proposed to make the casting carrying the sliding surface of high-alloy chilled cast iron.

In all of its variants the slide bearing according to the invention is distinguished by its high damage tolerance. Even if the slide bearing is tipped, an optimal self-ground clearance is formed due to the composite's inherent properties and restores the required plane parallelism of the running surfaces. This avoids component failure as a result of fracture of one or both elements of the sliding pair.

The drawing FIGURE illustrates a centrifugal pump 10 with slide bearings according to the invention. Pump 10 comprises a housing 11 held together by bolts 20 and a rotatable impeller shaft 12 mounted in the housing by slide bearings. Liquid is drawn into the pump through inlet 13 and passes through a plurality of pump stages 14 to pump outlet 15. Shaft 12 is provided with an axial bearing 17. The suction side radial bearing is comprised of a rotatable bearing part 18 mounted on the impeller shaft 12 for rotation therewith and a stationary bearing part mounted in housing 11 so that the sliding surfaces of the two parts engage each other. On the pressure side, the radial slide bearing comprises a rotatable part 18' on shaft 12, and a stationary part 19' mounted in the housing. Pumped liquid from the pressure side of the pump directly lubricates the pressure side slide bearing. A side stream of pumped liquid from the pressure side of the pump is diverted through a lubricant supply passage 16 to lubricate the suction side bearing. One part of each sliding pair is made of a composite material, and the other part of each sliding pair has a sliding surface that is made of a hard metal material and is supported by a supporting material, with the hard metal being joined to the support material by a bond produced in a molten state, e.g. by deposition welding.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A slide bearing for a centrifugal pump lubricated by a medium pumped by the pump, said pump having a housing and a rotatable shaft, said slide bearing comprising a stationary part disposed in the housing of the centrifugal pump and a rotatable part which is disposed on the shaft of the centrifugal pump and interacts with the stationary part to form a sliding pair, wherein one part of the sliding pair is made of a composite material, and the other part of the sliding pair has a sliding surface that is made of a hard metal material and is supported by a supporting material, wherein the hard metal material of the sliding surface and the supporting material that supports the sliding surface of said other part are joined by a bond produced in a molten state.

2. A slide bearing according to claim 1, wherein the composite material comprises carbon fibers or silicon carbide fibers in a matrix of polyetheretherketone (PEEK), carbon, or carbon combined with silicon carbide.

3. A slide bearing according to claim 1, wherein the supporting material is made of a ductile material; the bond between the supporting material and the hard metal material of the sliding surface is a melt bond produced by deposition welding.

4. A slide bearing according to claim 1, wherein said other part is a casting in which the supporting material and the material of the sliding surface are made of a homogenous, alloy.

5. A slide bearing according to claim 4, wherein the casting that carries the sliding surface is made of a cobalt-based alloy.

6. A slide bearing according to claim 4, wherein the casting that carries the sliding surface is made of high-alloy chilled cast iron.

* * * * *